Aug. 29, 1950          F. ADAMS          2,520,522
PRECUT ICE CREAM CAKE AND METHOD OF MAKING THE SAME
Filed Aug. 16, 1948          2 Sheets-Sheet 1
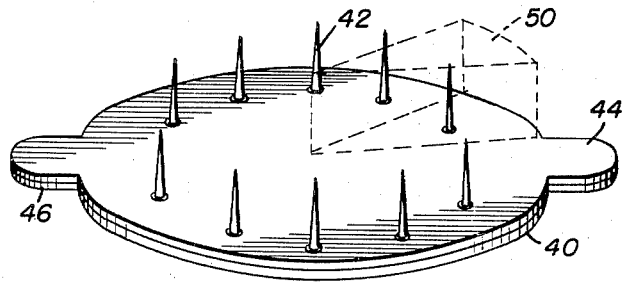
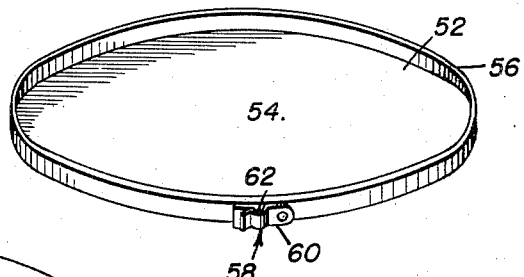
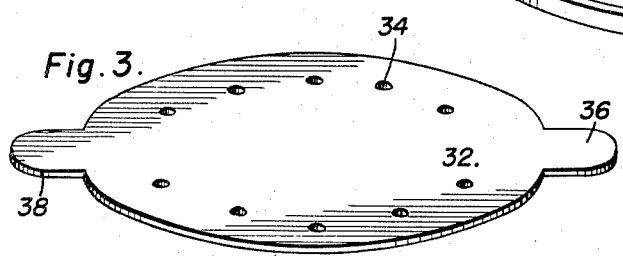
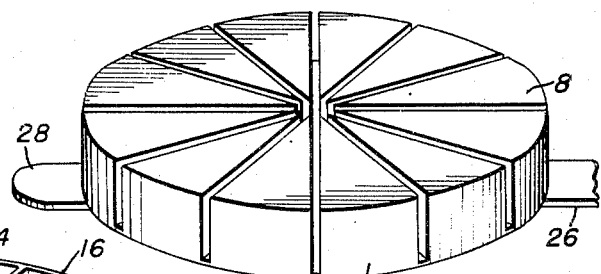
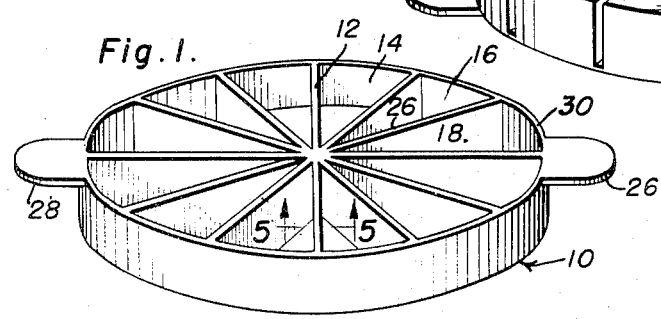
Frank Adams
INVENTOR.

Aug. 29, 1950            F. ADAMS            2,520,522
PRECUT ICE CREAM CAKE AND METHOD OF MAKING THE SAME
Filed Aug. 16, 1948            2 Sheets-Sheet 2
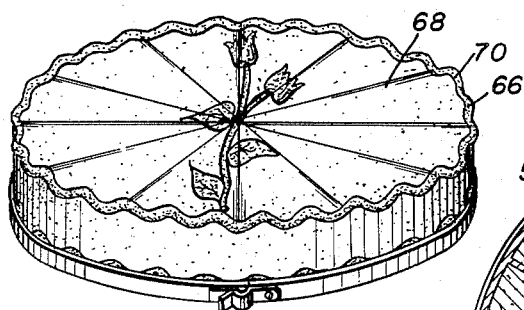
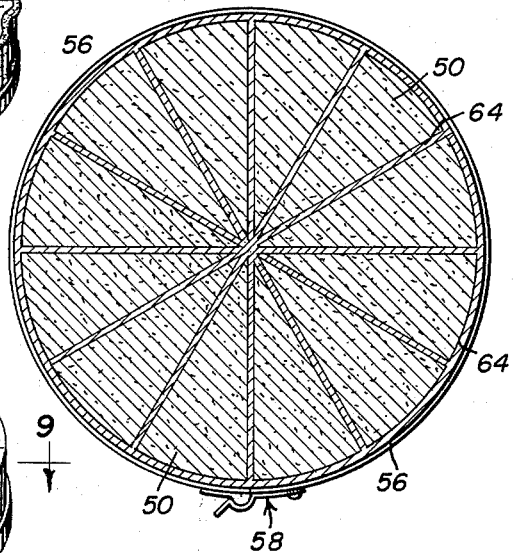
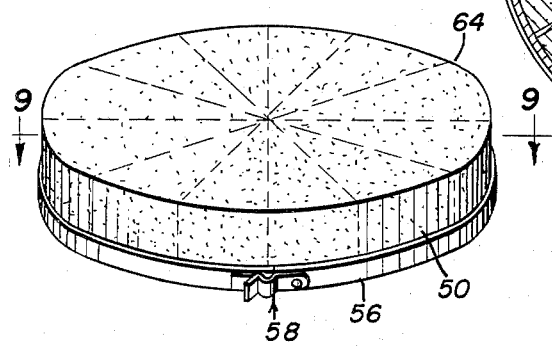
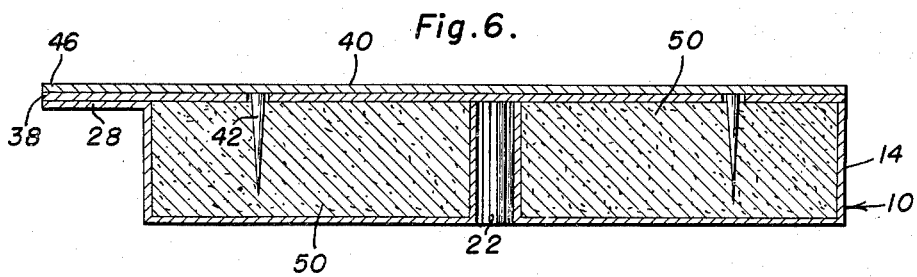
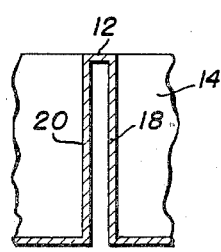
Frank Adams
*INVENTOR.*
BY *Clarence A. O'Brien
and Harvey B. Jacobson*
*Attorneys*

Patented Aug. 29, 1950

2,520,522

UNITED STATES PATENT OFFICE 2,520,522

PRECUT ICE CREAM CAKE AND METHOD OF MAKING THE SAME

Frank Adams, Brooklyn, N. Y.

Application August 16, 1948, Serial No. 44,564

11 Claims. (Cl. 99—137)

This invention relates generally to novel and utilitarian improvements in the method of forming, handling and serving molded forms of frozen confections, said forms being commonly termed ice cream cakes, and has for its primary purpose to improve upon the method disclosed by C. M. Policastro et al. in Patent 1,890,044, issued on December 6, 1932.

The above noted patent discloses a method of making an ice cream cake which comprises the steps of forming a mold of frozen confection, cutting the mold into a group of individual portions, freezing the portions, and thereafter moving the portions together as an apparent unit and inserting either completely between the adjacent portions or a short distance within one of the severances non-edible material, such as wax paper, cardboard, or the like. The assembled portions are then "iced" by applying a suitable frosting and thereafter decorating the cake in the desired manner. The decorated cake is then returned to the hardening room or zone so that the frosting will harden and form a shell about the top and outer sides of the portions and hold them together.

In carrying out the method taught in the reference, it has been found by those skilled in the art that the cutting operation requires a considerable expenditure of time and skill in forming properly proportioned servings, and further that during the cutting operation portions of the cake are broken off so that clean division lines are not obtained. The defective division lines render the subsequent operations more difficult and mar the appearance of the cake.

Frozen confection cakes are becoming increasingly popular and a constant demand for them is made at the smaller confectionery, ice cream, and bakery stores. The method taught in the above patent has been found of great value in mass production of the cakes, in a large ice cream plant, but there has arisen in the art a need for a method and apparatus which can be conveniently and efficiently employed by a small shop or store.

It is therefore the primary object of this invention to provide a simple and dependable method for forming individual servings of a frozen confection in an assembled unitary pattern or group, which may be artistically decorated or frosted in the desired manner.

Another important object of this invention is to provide a method and means for forming an ice cream cake consisting of a plurality of individual frozen confection segments arranged in a predetermined pattern and having edible separators positioned between the adjacent sections of the segments, with a shell of edible confection substantially covering the segments to retain them unitarily and edible division markers positioned on the shell in alignment with the edible separators so that the individual servings may be easily removed from the cake by employing a conventional kitchen or table knife and positioning the same downwardly through the division markers in the manner of cutting a baked confection.

Paralleling the primary purpose and objects of this invention, it is a further aim of this invention to obviate the defects in forming an ice cream cake, resulting from the cutting of a mold into a plurality of sections or portions and removing the need of employing any non-edible separating means between the adjacent portions, thereby providing a cake formed entirely from edible material and obviating any tendency of imparting bacterial or unsanitary adherence to the cake portions.

Another important object of this invention is to provide an apparatus for use in carrying out the novel method of forming a frozen confection mold, the apparatus being convenient and dependable for use and economically manufactured and employed.

These and ancillary objects and meritorious features both in method and apparatus, to become more fully apparent upon a perusal of the following description, are attained by this invention, certain features of which have been illustrated, by way of example only, in the accompanying drawings, in which:

Figure 1 is a perspective view of the form or mold employed in forming individual, inter-related portions of a frozen confection;

Figure 2 is an inverted view of the form shown in Figure 1;

Figure 3 is a perspective view of a cover and aligning member adapted to be detachably placed on the open top of the form;

Figure 4 is a retaining member adapted to be placed on top of an open form and having impaling members projectable through and into the form;

Figure 5 is a cross sectional view taken substantially on the plane of line 5—5 of Figure 1;

Figure 6 is a transverse vertical sectional view of the mold, apertured cover and retaining member when operatively associated with a frozen confection;

Figure 7 is a view in perspective of a retaining member, adapted to hold the group of individual servings, while the same are being decorated and until the servings are removed, when the cake is cut;

Figure 8 is a view in perspective of the individual servings retained on the supporting member prior to the coating or icing step;

Figure 9 is a sectional view taken on line 9—9 of Figure 8 and looking in the direction of the arrows; and Figure 10 is a view in perspective of the substantially cylindrical ice cream cake, constituting the finished product and showing the same suitably decorated with a suitable frosting or coating and having elaborate designs or patterns thereon and edible dividing markers in alignment with the adjacent sections of each serving.

Apparatus

Referring to Figures 1-4 of the drawings, in forming the ice cream cake, a mold or form 10 is employed. The form may be of any desired shape or size, depending upon the type of cake desired, and is shown as cylindrical by way of illustration only. A plurality of radially extending partitions 12 are disposed within the form, hereinafter referred to as a compartmented container or form, the partition members defining a plurality of juxtaposed compartments or zones 14, which impart the desired shape to the individual servings constituting the unitary cake.

It is to be particularly noted in Figures 1 and 2 that the compartments 14 are completely separated and spaced from their neighbors and are only interconnected through the medium of the horizontally positioned, radially extending partition members 12. In this respect, each of the compartments or individual containers 14 comprises a bottom wall 8, and a substantially arcuately configured or curved end wall 16, having extending converging side walls 18 and 20 which are joined at their opposite ends, terminating in a point at the central open hub 22. The open hub 22 is closed at the top end by the common junction of the partition members, as seen at 24. The compartments thus define a plurality of segments which are commonly grouped and interconnected to form the compartmented container or form 10.

For ease and convenience in handling the form, a pair of lateral, outwardly extending handles or ears 26 and 28 are disposed on opposite sides of the form, extending from the circular rim 30 which connects the outer ends of the partition members 12 and constitutes an integral compartmented form.

As illustrated in Figure 6, the cover member shown in Figure 3 is adapted to be positioned on the rim 30 in closure placement on the open faces of the individual compartments. The cover member 32 is formed complementary to the compartmented container and has a series of circumferentially spaced openings or apertures 34, which are registerable or alignable with each compartment when the member is placed on the rim 30. To aid the placement and removal of the cover member and coincidentally to function as an alignment means for the apertures 34, the cover member is provided with a pair of laterally extending ears or handles 36 and 38 which extend integrally in opposite directions from the periphery of the cover member.

A retaining rack 40, shown in Figure 4 and in operative attachment in Figure 6, is adapted to detachably seat on the cover member 32, which is interposed between the compartmented container and the rack. A plurality of circumferentially arranged impaling members or pins 42 depend from the under surface of the rack, as seen in Figure 4. A pair of oppositely extending lateral handles 44 and 46 are projected from the periphery of the rack.

Method

The apparatus illustrated in Figures 1-4, inclusive, and above described is employed in carrying out the novel method of forming an improved ice cream cake.

The ice cream employed is made in the conventional manner by subjecting a creamy liquid to a freezing temperature and agitating the liquid during the freezing process. The ice cream is removed from the freezer in a semi-liquid or semi-plastic state and is soft and mushy. While in this state, the ice cream is dipped from the freezer and packed into the compartmented form 10. The ice cream is firmly packed in each of the compartments 14 to avoid air bubbles. A spatula or conventional packing member is employed to push the ice cream firmly down into the compartments. The ice cream or similar frozen confection, such as frozen ice or the like, is smoothed off the open top of the container so that the partition members are exposed and the upper portion of the ice cream in the compartments is level with the partition members.

The covering member 32 is then seated upon the rim 30 and the partition members 12, with the handles of the covering member and the compartmented form or container in vertical alignment. At this time, the rack 40 is inverted and brought down on top of the covering member 32 and superposed thereon. The depending impaling pins 42 are projected through the apertures 34 in the covering member and extend inwardly into the compartments, piercing the individual servings or portions of the frozen confection, 50, as seen in Figure 6. The insertion of the pins is easily carried out by aligning the handles 44 and 46 with the aligned handles of the compartmented form and covering member.

The form 10 is then placed in a cooling zone and subjected to a low temperature atmosphere, resulting in the hardening throughout of each individual serving 50.

After the individual servings have been hardened, the compartmented form is withdrawn from the freezing atmosphere, through the medium of the aligned handles, and the form is subjected to a thawing process. It is preferred to dip the form or container in a vat or tank of hot water, which would loosen the servings or portions of ice cream from their adherence to the bottom walls and side walls of the individual compartments. In this respect, if desired, the thawing or defrosting requirement could be dispensed with by coating the inner surfaces of the individual compartments preliminary to the packing of the ice cream therein. A gelatine composition or shortening (such as hydrogenated fats) may be spread lightly on the inner surfaces of the walls of the compartments so as to thinly coat the walls. The liner substances will solidify prior to the solidification of the frozen confection mixture, the shortening being preferred, since it solidifies at room temperature and will prevent the ice cream from contacting the compartment surfaces and obviate any adherence thereto.

If the liner is not employed, it is to be noted that the open spaces between the side walls of each compartment will enable the thawing agent to engage the complete outer surfaces of the side walls and thereby expedite the thawing process.

At this time, the joined form, covering member and rack are positioned on a horizontal support, such as a working table, with the upper surface of the rack seated on the support. The extending handles 26 and 28 of the form are then grasped and the form is moved upwardly from the rack, so that each individual serving 50 is positioned on the under surface of the rack and held intact by its retaining or impaling pin, as seen in Figure 4 wherein an individual serving is shown in phantom lines. The impaling pins will be securely imprisoned or held within the individual portions or servings, the same having been hardened on the pins during the freezing operation and unaffected by the thawing operation, which acts only on the outer surfaces of the individual servings. The individual servings are thus preserved in a group in the pre-arranged pattern imparted to them by the compartmented form or container during the freezing operation.

While so preserving the group in the pattern, the group is dipped in a liquid coating such as a vegetable coating or shortening solution, which will solidify on contacting the surfaces of the servings or portions, and cover the surfaces with a thin coating, the shortening being tasteless. It is to be noted that the individual portions are simultaneously coated during the dipping process with the tasteless fat substance and the adjacent sections of each serving are completely covered with the vegetable coating.

The portions are removed from the liquid bath and are positioned on a retaining member, 52, shown in Figure 7 and Figure 8. The retaining member comprises a base portion 54 formed from a cardboard or paper disk and having an upstanding split annular side wall 56. The split ends of the ring are provided with complementary locking means 58 which comprises a latching member or locking member 60 formed from a flexible resilient material, such as spring steel or the like, and having an arcuate locking portion which is adapted to engage on an extending lug or protuberance 62 carried by the other end. The clasp or latch 58 retains the side walls in an integral formation and thereby retains the individual servings 50 of the frozen confection in an inter-related juxtaposed formation, as seen in Figure 8.

After the servings are placed on the disk-shaped base 54 of the retaining member, the rack is withdrawn, removing the impaling pins from the servings. Thus, as shown in Figure 9 of the drawings, the individual servings 50 are disposed in a pre-arranged pattern, shown as cylindrical, and are spaced from direct contact with their neighbors through the edible separators 64, formed from the liquid coating.

The frozen confection mold or cake is now assembled in a unitary mold and is, at this time, ready to be decorated and frosted.

A suitable frosting or icing, of a confectionery substance, is conventionally applied to the top and outer ends of the portions collectively. The frosting, which may be of a similar frozen confection as the individual servings and which may be differently colored and artistically applied, is commonly disposed on the portions forming a common shell thereon. The common shell 66 serves to retain the portions collectively in a patterned group but is aided in this function through the medium of the retaining member 52 and, more particularly, the upstanding annular side wall thereon, which is adapted to engage the lower outer edges of the individual portions and hold them in a collective association or unit.

When applying the icing or ice cream shell 66, confection division markers 68 are radially applied to the top of the unitary cake 10 in vertical alignment with the edible separators 64 so that a purchaser can visually realize and perceive the points of division between the individual portions. The division markers serve as indicating means for the points of division between the servings so that a purchaser can employ the points as severance lines and sever a selected serving from its collective neighbors by cutting through the marking points.

The cake 10 is retained on the supporting disk and within the retaining ring and held together thereby. The patterned mold or cake is then stored in a hardening room so that the shell will harden and the same is maintained in an atmosphere of low temperature until it is ready for shipment. Of course, in shipping or delivering the cake, conventional cartons or boxes are employed and are packed with "dry ice" to sustain the cake in a hardened state.

A purchaser would remove the cake and retaining member from the carton, and latch or unhook the snap from the retaining ring and employ a table knife or the like for easy removal of the cake therefrom.

The foregoing frosting or icing is formed from butter cream, ice cream or the like. However, whipped cream is employed conventionally as an icing and is preferred in carrying out this method in that the use of the same would not entail the employment of division markers and would obviate the need for using a cutting instrument. In this respect, the segments coated with whipped cream would be held on the supporting disk in a unitary manner. A purchaser would unhook or unclasp the snap on the retaining ring, which would cause each segment or piece separated from its neighbors by the surface coating to move away from the adjacent pieces. Then, a fork could be employed to pierce or spear the desired segment or piece and lift the same from the supporting disk. In this manner, a knife is never employed and no cutting or the like is needed to separate the segments from the apparently unitary cake.

It is, of course, to be appreciated that the compartmented mold can be made in various shapes and, dependent on the shape, will govern the configuration of the cake resulting from the collective individual servings. Further, since many variations in method and apparatus and sundry other functions will become apparent to those skilled in the art upon a study of the foregoing description in view of the accompanying drawings, it is to be understood that this invention is to be limited only by the appended claims when interpreted in the light of the spirit of the invention.

Having described the invention, what is claimed as new is:

1. The method of forming an ice cream cake comprising the steps of simultaneously impaling a plurality of individual portions of a frozen confection in an impaled group formation, simultaneously coating the adjacent sections of said portions to prevent direct contact between the portions with an edible substance solidified upon contact with the surfaces of said portions, simultaneously releasing said portions from impalement and assembling them in a grouped pattern and forming an edible common shell about the portions to retain the grouped portions together and formed in a unitary desired configuration.

2. The method of forming an ice cream cake comprising the steps of packing a semi-frozen confection in a mold of interconnected zones, and thereby forming a plurality of separate portions, simultaneously impaling each portion in group form, freezing said impaled group of portions, and thereafter thawing the portions and removing them as a group from the mold, simultaneously dipping the portions as a group in an edible substance solidifying on contacting the surfaces of the portions, simultaneously releasing said portions from impalement and assembling them in a juxtaposed pattern, covering said portions with a common edible shell and maintaining said portioned pattern at a sub-freezing temperature to retain the portions together in the pattern.

3. The method of forming an ice cream cake comprising the steps of freezing as a group individual servings of a semi-frozen confection in a pre-arranged pattern, preserving said servings as a group in such pattern and while so preserving said group dipping the group in an edible liquid coating solidifying upon contacting the surfaces of the servings, simultaneously releasing said portions from said group formation and assembling said servings in a juxtaposed formation, covering said group with a common edible confection shell, forming division points on said shell in alignment with the contacting portion of adjacent servings, and maintaining said groups in said formation at a sub-freezing temperature to retain the servings as a unitary whole.

4. The method of forming an ice cream cake comprising the steps of packing a semi-frozen confection in a mold having a plurality of interconnected compartments, and thereby forming a group of individual servings, freezing said servings as a group and thereafter thawing the servings as a group, preserving said thawed servings as a group and while so preserving the servings dipping them in an edible liquid coating solidifying upon contacting the surfaces of the servings, simultaneously releasing said portions from the group formation and assembling them together into a prearranged pattern and covering them with a common edible shell and hardening said shell to temporarily form the servings in the pre-arranged unitary pattern.

5. The method of forming an ice cream cake comprising the steps of packing a semi-frozen confection in a compartmented mold, freezing said individual servings as a group, preserving the servings as a group and while so preserving them removing them from the mold and dipping the group in an edible liquid coating solidifying upon contacting the surfaces of the servings, simultaneously assembling said servings in a pattern formation and covering said servings with a common edible shell and maintaining said servings in said formation at a sub-freezing temperature to harden the shell.

6. The method of forming an ice cream cake comprising the steps of packing a semi-frozen confection in a compartmented container and thereby forming a plurality of individual servings, simultaneously inter-relating each serving in a group, freezing said group and preserving the servings as a group and while so preserving the servings thawing the servings and releasing them from the container, and simultaneously dipping the servings in an edible liquid coating solidifying upon contacting the surfaces of the servings, assembling said group in a pre-arranged pattern, covering said servings with an edible common shell and subjecting said shell covered servings to a sub-freezing temperature to sustain the portions in the assembled pattern.

7. An ice cream cake comprising a group of individual separable frozen confection units, an edible separator positioned entirely between said units and a shell of edible confection covering said units and forming a unitary separable article.

8. An ice cream cake comprising a group of individual frozen confection portions arranged in a predetermined pattern, edible separators positioned between and entirely covering adjacent surfaces of said portions, a shell of edible confection substantially covering said portions to retain them unitarily in the pattern and edible division markers on said shell in alignment with the edible separators.

9. An ice cream cake comprising a group of individual frozen confection segments arranged in a predetermined inter-related pattern, edible separators solidified between adjacent sections of said segments and entirely covering the side surface of said segments, a common edible confection covering on said segments to retain them unitarily in the pattern and a non-edible circumjacent supporting member.

10. The method of forming an ice cream cake comprising the steps of freezing as an impaled group individual servings of ice cream, preserving said servings as an impaled group and while so preserving said servings dipping the group in an edible liquid coating solidifying upon contacting the surfaces of said servings, simultaneously releasing said servings from impalement and assembling said servings in a prearranged pattern, covering said portioned pattern of servings with an edible common shell and maintaining said portioned pattern at a subfreezing temperature.

11. The method of forming an ice cream cake comprising the steps of packing a semi-frozen confection in a compartmented mold and thereby forming a plurality of adjacent portions, impaling said portions in a group formation, freezing said portions and thereafter thawing the portions, preserving the thawed portions as a group and while so preserving the portions dipping them in an edible coating which solidifies upon contacting the surfaces of the portions, simultaneously releasing the portions from the group formation and assembling them together in a pre-arranged pattern, covering said portioned-pattern with an edible shell and hardening said shell to bind the portions together.

FRANK ADAMS.

REFERENCES CITED

The following references are of record in the file of this patent:

UNITED STATES PATENTS

| Number | Name | Date |
|---|---|---|
| 1,501,659 | Haddad | July 15, 1924 |
| 1,638,548 | Nelson | Aug. 9, 1927 |
| 1,882,290 | Meagher | Oct. 11, 1932 |
| 1,890,044 | Policastro et al. | Dec. 6, 1932 |
| 2,169,485 | Bucher | Aug. 15, 1939 |